(12) United States Patent
Mindnich et al.

(10) Patent No.: US 10,324,927 B2
(45) Date of Patent: Jun. 18, 2019

(54) DATA-DRIVEN UNION PRUNING IN A DATABASE SEMANTIC LAYER

(71) Applicant: SAP SE, Walldorf (DE)

(72) Inventors: Tobias Mindnich, Sulzbach (DE); Julian Schwing, Mannheim (DE); Christoph Weyerhaeuser, Heidelberg (DE); Isil Pekel, Heidelberg (DE); Johannes Merx, Heidelberg (DE); Alena Bakulina, Mannheim (DE)

(73) Assignee: SAP SE, Walldorf (DE)

( * ) Notice: Subject to any disclaimer, the term of this patent is extended or adjusted under 35 U.S.C. 154(b) by 437 days.

(21) Appl. No.: 14/946,658

(22) Filed: Nov. 19, 2015

(65) Prior Publication Data
US 2017/0147637 A1    May 25, 2017

(51) Int. Cl.
*G06F 16/2453*    (2019.01)
(52) U.S. Cl.
CPC .............................. *G06F 16/24534* (2019.01)
(58) Field of Classification Search
CPC ................. G06F 17/30448; G06F 16/24534
USPC .......................................................... 707/765
See application file for complete search history.

(56) References Cited

U.S. PATENT DOCUMENTS

| 2012/0005190 A1* | 1/2012 | Faerber | ............. G06F 17/30404 |
| | | | 707/718 |
| 2015/0149442 A1* | 5/2015 | Kim | ................. G06F 17/30469 |
| | | | 707/719 |

* cited by examiner

*Primary Examiner* — Kimberly L Wilson
(74) *Attorney, Agent, or Firm* — Mintz Levin Cohn Ferris Glovsky and Popeo, P.C.

(57) ABSTRACT

Methods and apparatus, including computer program products, are provided for union node pruning. In one aspect, there is provided a method, which may include receiving, by a calculation engine, a query; processing a calculation scenario including a union node; accessing a pruning table associated with the union node, wherein the pruning table includes semantic information describing the first input from the first data source node and the second input from the second data source node; determining whether the first data source node and the second data source node can be pruned by at least comparing the semantic information to at least one filter of the query; and pruning, based on a result of the determining, at least one the first data source node or the second data source node. Related apparatus, systems, methods, and articles are also described.

17 Claims, 5 Drawing Sheets

Figure 1: A simple scenario and pruning table

US 10,324,927 B2

DATA-DRIVEN UNION PRUNING IN A DATABASE SEMANTIC LAYER

FIELD

The present disclosure generally relates to data processing and, in particular, databases.

BACKGROUND

Database queries have become increasingly complex. Often, a query or other operation on a database requires a sequence of operations. As a consequence, some developers use tools to model the operations, and the models may describe the sequence using elements such as calculation nodes. These calculation nodes can represent an operation, such as a projection, an aggregation, a join, a union, a minus, an intersection, and the like. To enable reuse and flexibility, developers often use a calculation scenario that describes the sequence in a general way, such as in the form of a data flow consisting of calculation nodes. In some instances, tools may be used to optimize the calculation scenario prior to execution on the underlying database.

SUMMARY

Methods and apparatus, including computer program products, are provided for union node pruning.

In one aspect, there is provided a method, which may include receiving, by a calculation engine, a query; processing a calculation scenario including a union node, wherein the union node receives at least a first input from a first data source node and a second input from a second data source node; accessing a pruning table associated with the union node, wherein the pruning table includes semantic information describing the first input from the first data source node and the second input from the second data source node; determining whether the first data source node and the second data source node can be pruned by at least comparing the semantic information to at least one filter of the query; and pruning, based on a result of the determining, at least one the first data source node or the second data source node.

In some implementations, the above-noted aspects may further include additional features described herein including one or more of the following. The union node may include an indication identifying the pruning table. The pruning table may include input identification information for the first input and/or the second input. The pruning table may include a calculation scenario identifier. The pruning table may include the semantic information including a description of the type of data being provided to the union node by the first data source node and/or the second data source. The pruning table may include, for the description, one or more values representing a range of values. The pruning table may include, for the description, a threshold value. The threshold value may indicate whether the first data source node includes data that is greater than, less than, or equal to the threshold value. The comparing may include comparing the at least one filter to the threshold value.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
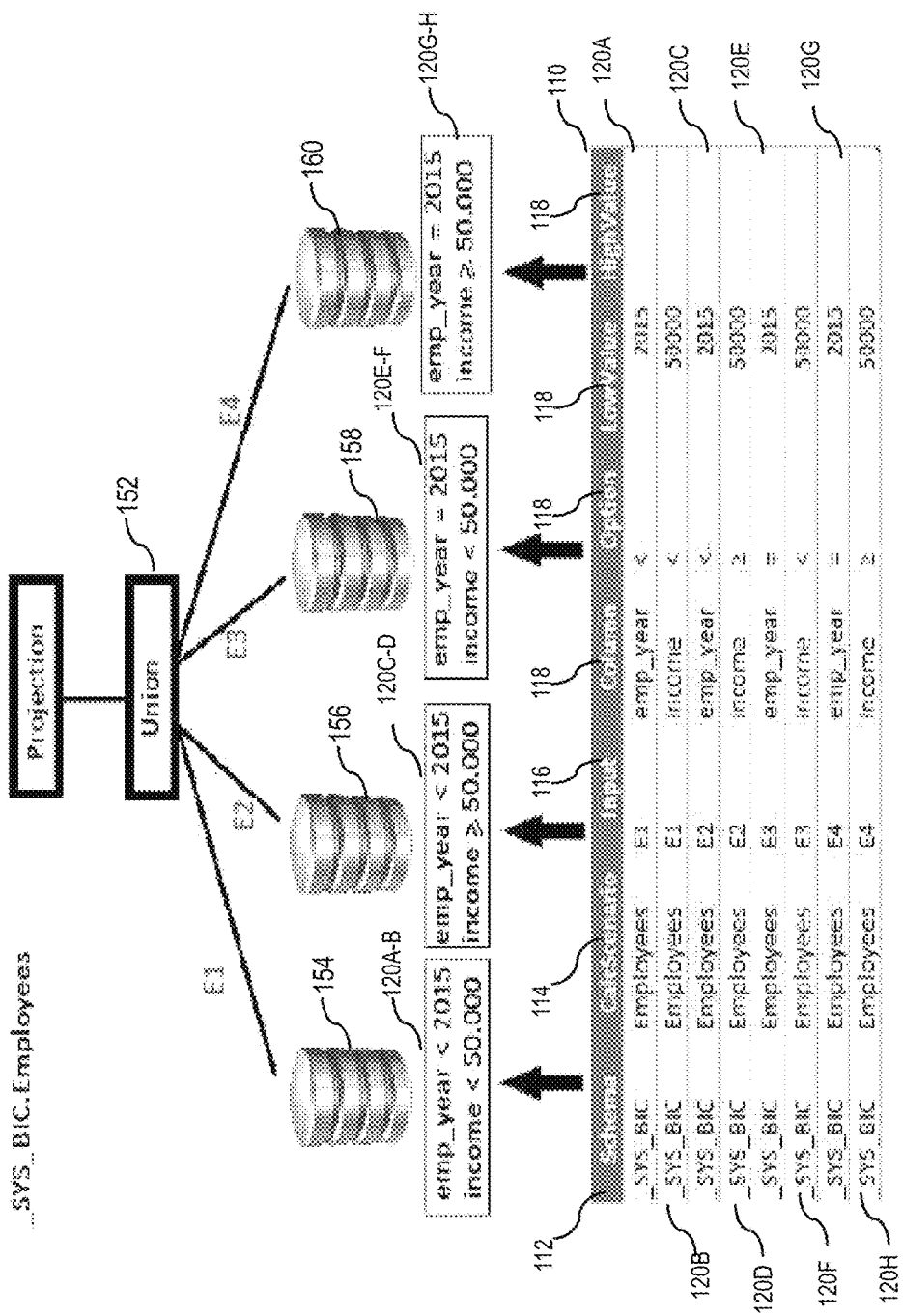
FIG. 1 depicts an example of a UNION node and corresponding pruning table.

Like labels are used to refer to same or similar items in the drawings.

DETAILED DESCRIPTION

A calculation scenario may represent a model, and this model may represent a sequence of steps to be performed in a database, such as an in-memory database. Specifically, the calculation scenario may model a complex query and/or other operations to be performed at the in-memory database. Often, the calculation scenarios are modeled in a somewhat general way to enable reuse and flexibility. This flexibility may, however, result in a calculation scenario that exposes more data attributes than is actually needed in some instances. This generalization may thus cause an increased size in the set of attributes and the corresponding calculation scenario, which makes parsing, persisting, and/or optimizing of the calculation scenarios more processor, memory, and/or power intensive. This increase in size may also cause an increase in the quantity of calculation nodes (such as operations) in a given calculation scenario, so more threads may need to be executed which compete for available CPU cores.

A query in a calculation scenario may specify the requested one or more attributes, one or more key figures, and one or more filter conditions. The calculation engine may have an instantiation process. The instantiation process may combine the query with the calculation scenario and then remove unnecessary attributes (that are not part of the query, for example). The optimization may include pushing filters down to a lower level in the execution of the calculation scenario, so that intermediate results are reduced in size earlier in the calculation scenario.

Moreover, any attributes that are not required for a given query or operation can be removed from the model, which may decrease the model's complexity (which may also make the calculation scenarios less processor, memory, and/or power intensive). Although data sources that are not required for a given query or operation can be removed from the model, it may be difficult, due to various data dependencies and other data complexities, to assess whether certain attributes are required from a given data source. To illustrate, the UNION operator is a command that can be used as a node in a calculation scenario, or its model. The UNION operator may be likened to the UNION ALL operator in SQL level. The UNION operator may be used to combine the result sets of two or more nodes, without removing duplicates (thus, the name UNION). In a calculation scenario that includes the UNION node, it may be very difficult, as noted, to predict whether there is relevant or needed content at each of the input data sources to a UNION node. As such, it may not be possible to prune, such as remove, in order to optimize, unneeded inputs and their corresponding data sources to a UNION node of a calculation scenario.

In some example embodiments, there is provided a way to prune the inputs to a UNION node by use of a pruning table including semantic information for the inputs to the UNION node.

By way of example, data may be stored in a structured way for management purposes by for example semantically splitting database tables. To illustrate, data may be aggregated and stored over a long period of time. As such, data belonging to different time periods can be archived in different tables. In calculation models, these tables are UNIONed to provide a response to queries that possibly cover multiple time periods. Trivial partitioning with constant mappings, such as "YEAR=2013," can be modeled on a related node, so that the calculation engine can use this partitioning information to restrict requested data to certain data partitions. Unfortunately, trivial partitioning may not be sufficient for complex data scenarios. For example, if an input to a UNION node of a calculation scenario is supposed to hold data for two years (for example, 2013 and 2014), it is no longer possible in this example to map the value of the YEAR column to a single constant value. Since semantic information cannot typically be stored within a data source or nodes, all data sources that are input to a UNION node may need to be scanned (for example, read) for a possible match with a specific period. As such, there is a need to pass information to the calculation engine (or its models), so that irrelevant data inputs can be removed during the optimization process. This reduction in irrelevant data may also lead to reduced query time. As such, there is provided, in some example embodiments, a pruning table including semantic information for the inputs to the UNION node.

In some example embodiments, pruning of the inputs to a UNION node (which is included in a calculation scenario) may be enabled by use of a pruning table. The pruning table may provide a structured way to store semantic information about the inputs to a UNION operator or UNION node. For example, the pruning table may provide semantic information to enable determining whether a data input to a UNION node is relevant to a current filter of a query. If an input is not relevant (for example, not needed), the irrelevant data sources can be removed before they are processed by a calculation engine.

FIG. 1 depicts a portion of calculation scenario including a union node 152 representative of a UNION operation of 4 input data sources, input E1 154, input E2 156, input E3 158, and input E4 160.

FIG. 1 also shows an example of a pruning table 110, in accordance with some example embodiments.

In some example of FIG. 1, UNION node 152 may, in accordance with some example embodiments, include a field that identifies pruning table 110. The pruning table 110 may store semantic information describing the input data sources to the UNION node 152. In some example embodiments, the pruning table 110 may have a pre-defined structure. This predefined structure may enable the unique identification of input data sources 154-160 to the UNION node 152.

The UNION node pruning table 110 may have a structure including one or more of the following: a schema 112 identifying the database of interest, a calculation scenario identifier 114 that identifies the calculation scenario (or model at the calculation engine) that the UNION node is associated with, an input identifier 116 that identifies which input to the UNION node is being described at a given row (or portion) of the pruning table 110, and/or other semantic information 118 that describes the data input in a way to allow comparison with the filter(s) of a query or other operation. For example, the table may include data ranges or threshold values indicating whether the data source for a given node is greater to, less than, or equal to the threshold value (or within a certain range).

Although pruning table 110 depicts semantic information for a single calculation scenario 114 (labeled "Employees"), the pruning table may also store semantic information for a plurality of calculation scenarios as well. In this way, the pruning tables may be accessed during optimization to determine the relevant or required data input sources for a given calculation scenario, and, as such, only the relevant data entries are fetched.

The pruning table 110 may store, as noted, sematic information regarding each of the data sources 154-160. Moreover, the semantic information may summarize in a compact way the types of data at the data stores 154-160 to enable a comparison between the sematic information for a given data source input and filter(s) for a query or other operation. For example, the data input from data source E1 154 may store data of employees who were employed before 2015 and earned less than 50000. This semantic information may be obtained from 120A-B, which are the first two lines of pruning table 110. The calculation engine may also access the semantic information 120C-D to quickly determine that data source E2 156 holds data of employees who were employed before 2015 and earned more than 50000. Likewise, calculation engine may access semantic information 120E-F to quickly determine that data source E3 158 may hold data of employees who were employed on 2015 and earned less than 50000, and calculation engine may access semantic information 120G-H to determine that data source E4 160 may hold data of employees who were employed on 2015 and earned more than 50000. The calculation engine may thus access the pruning table 110 to obtain the sematic information 120A-H, and determine (for a given query or operation that is part of a given calculation scenario) whether the input is relevant or can be pruned to reduce the data source inputs to the UNION node 152.

Although the previous example describes the pruning table being used to assess the inputs to a UNION node of a calculation scenario, the pruning table including the semantic information may be used to assess the inputs of the UNION node associated with other types of calculations as well. Moreover, although some of the examples described herein refer to the pruning table being accessed and evaluated by a calculation engine, other types of processors may access and/or evaluate the pruning table as well.

Figure 2:
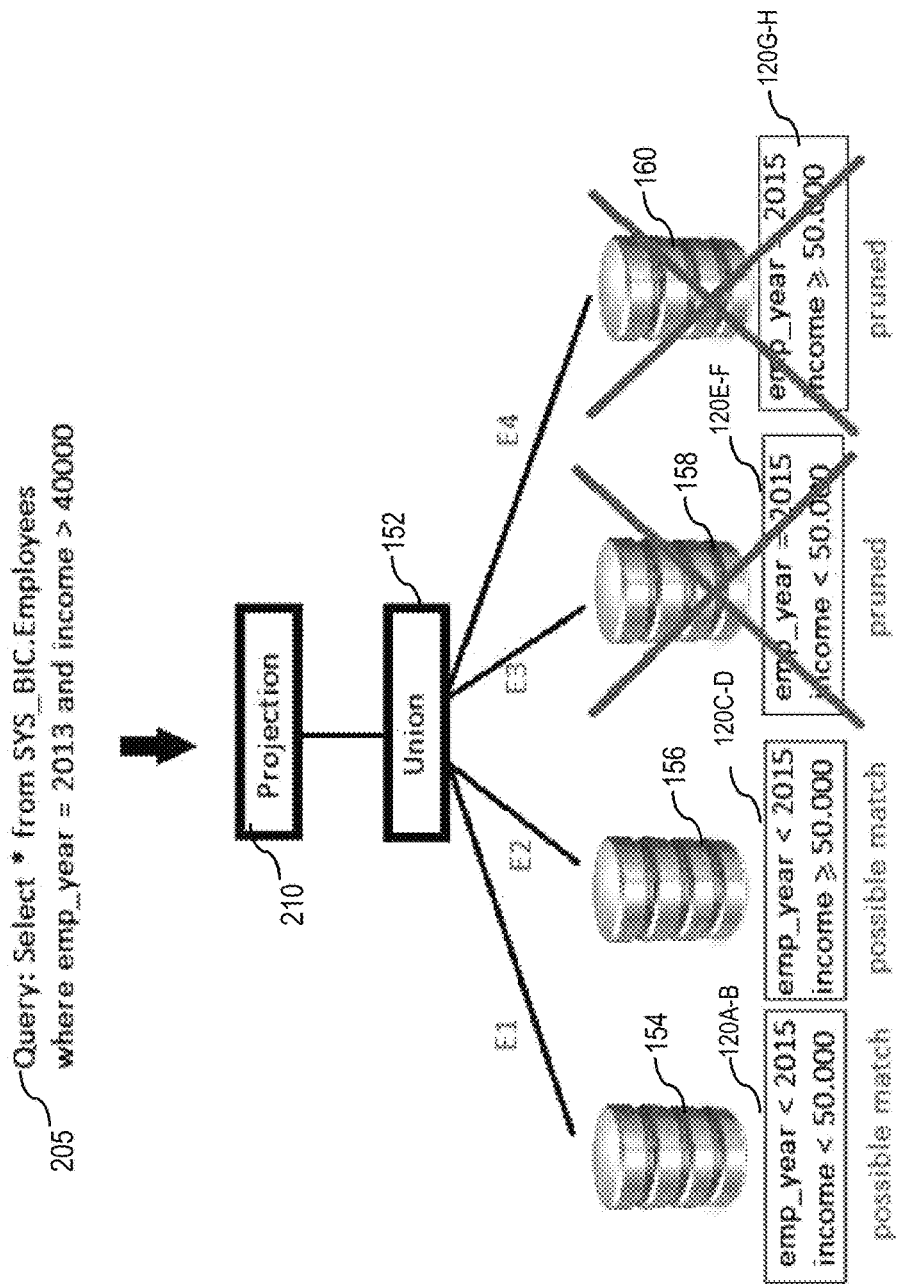
FIG. 2 depicts an example of a UNION node having pruned inputs.

FIG. 2 depicts a query 205 comprising the following: Select * from SYS_BIC.Employees, where emp_year=2013 and income>40000. This query 205 provides all employees that were employed in 2013 and that earned more than 40000. In this example, the query 205 includes filters on employees and income.

Before execution of the query at the database layer, the calculation engine may model the query 205 as a graph of one or more nodes as shown by the projection 210 including UNION node 152 and data source nodes 154-160. The calculation engine may access the pruning table 110 (FIG. 1) to determine whether the filters for emp_year=2013 and income>40000 make the data sources 154-160 relevant for the query 205. In this example, the calculation engine may determine, based on the semantic information 120A-D from the pruning table 110, that data sources E1 and E2 154-156 are relevant and thus are likely to have matching records for query 205 (or its filter). The calculation engine may also determine, based on the semantic information 120E-H from the pruning table 110, that data sources E3 and E4 158-160 are not relevant and thus are unlikely to have matching records for query 205 (or its filter). As such, the calculation engine may, based on a comparison of the semantic information and filter values, prune data sources E3 and E4 158-160. The pruning provides an optimized calculation scenario for a query using the data from the pruned UNION node. As such, the query, when executed at a database layer of a database system, will be executed using less power, memory, computing resources, and/or the like.

Although the pruning table 110 described above can be used in a variety of computing environments, operating systems, and databases, the following describes an example system implementation including a calculation engine using the UNION pruning table 110 disclosed herein.

Figure 3:
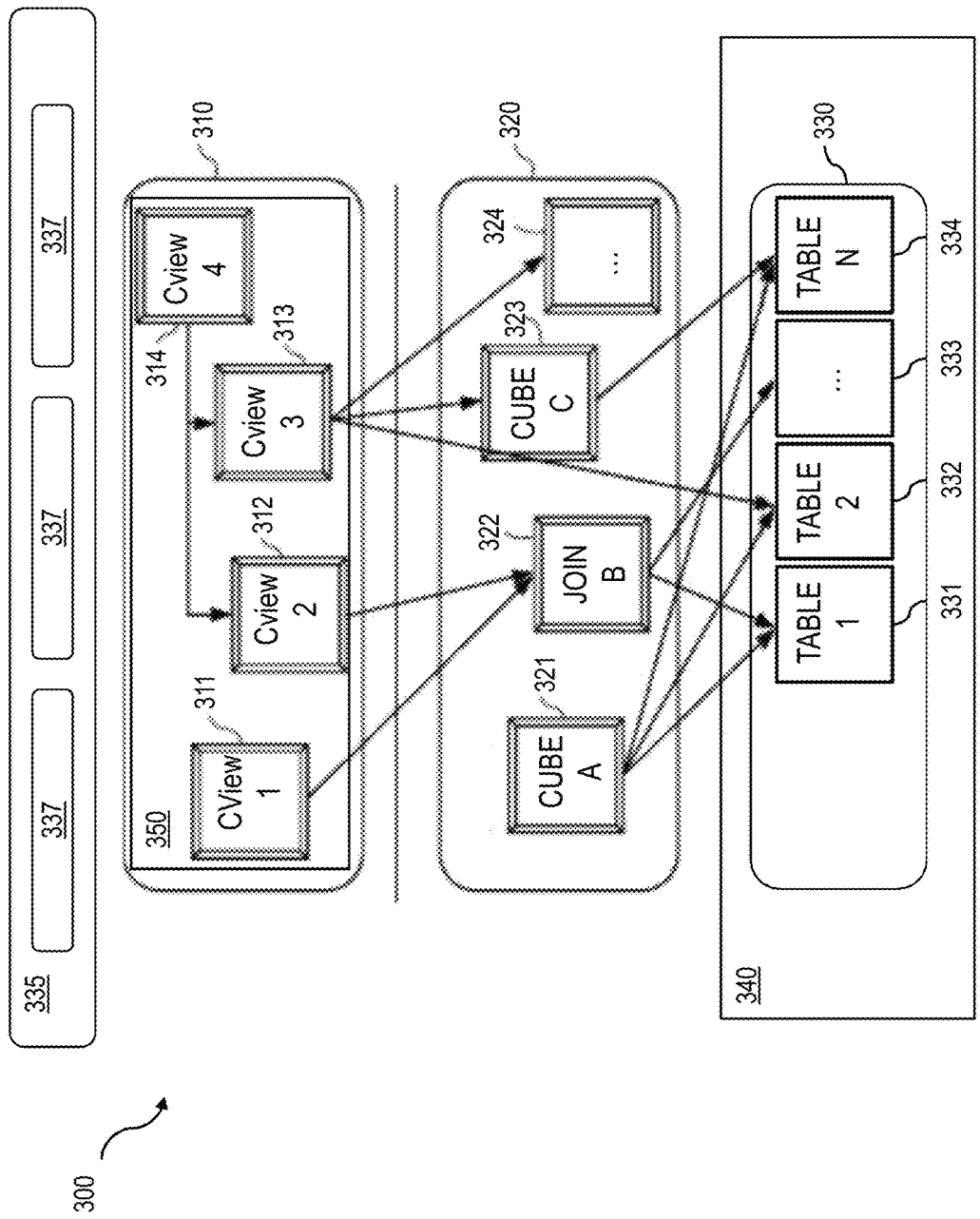
FIG. 3 depicts an example of a system including a calculation engine in which UNION pruning may be performed.

FIG. 3 is a diagram that illustrates a computing architecture 310 including a database system 300 that includes three layers: a calculation engine layer 310, a logical layer 320, and a physical table-pool 330. One or more application servers 335 implementing database client applications 337 can access the database system 300. Calculation scenarios can be executed by a calculation engine, which can form part of a database or which can be part of the calculation engine layer 310 (which is associated with the database). The calculation engine layer 310 can be based on and/or interact with the other two layers, the logical layer 320 and the physical table pool 330. The basis of the physical table pool 330 consists of physical tables (also called indexes or database tables) containing the data, which can be stored on one more database servers 340. Various tables 331-334 can be joined using logical metamodels (also called models) 321-324 defined by the logical layer 320 to form an index. For example, the tables 331-334 in a cube (e.g. an online analytical processing or "OLAP" index) can be assigned roles (e.g., fact or dimension tables) and joined to form a star schema. It is also possible to form join indexes (e.g. join index B 322 in FIG. 3), which can act like database views in computing environments such as the Fast Search Infrastructure (FSI) available from SAP SE of Walldorf, Germany.

As stated above, a calculation scenario 350 can include individual nodes (e.g. calculation nodes) 311-314, which in turn each define operations such as joining various physical or logical indexes and other calculation nodes (e.g., CView 4 is a join of CView 2 and CView 3). That is, the input for a node 311-314 can be one or more physical, join, or OLAP indexes or calculation nodes.

In some example embodiments, the calculation scenario may include a UNION node as noted above with respect to FIGS. 1 and 2. When this is the case, the calculation engine may access a pruning table to determine whether any of the data input nodes to the UNION node can be pruned.

In a calculation scenario 350, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 350 can be created which can be reused by multiple queries even if such queries do not require every attribute specified by the calculation scenario 350.

Every calculation scenario 350 can be uniquely identifiable by a name (e.g., the calculation scenario 350 can be a database object with a unique identifier, etc.). Accordingly, the calculation scenario 350 can be queried in a manner similar to a view in a SQL database. Thus, the query is forwarded to the calculation node 311-314 for the calculation scenario 350 that is marked as the corresponding default node. In addition, a query can be executed on a particular calculation node 311-314 (as specified in the query). Furthermore, nested calculation scenarios can be generated in which one calculation scenario 350 is used as source in another calculation scenario (e.g. via a calculation node 311-314 in this calculation scenario 350). Each calculation node 311-314 can have one or more output tables. One output table can be consumed by several calculation nodes 311-314.

Figure 4:
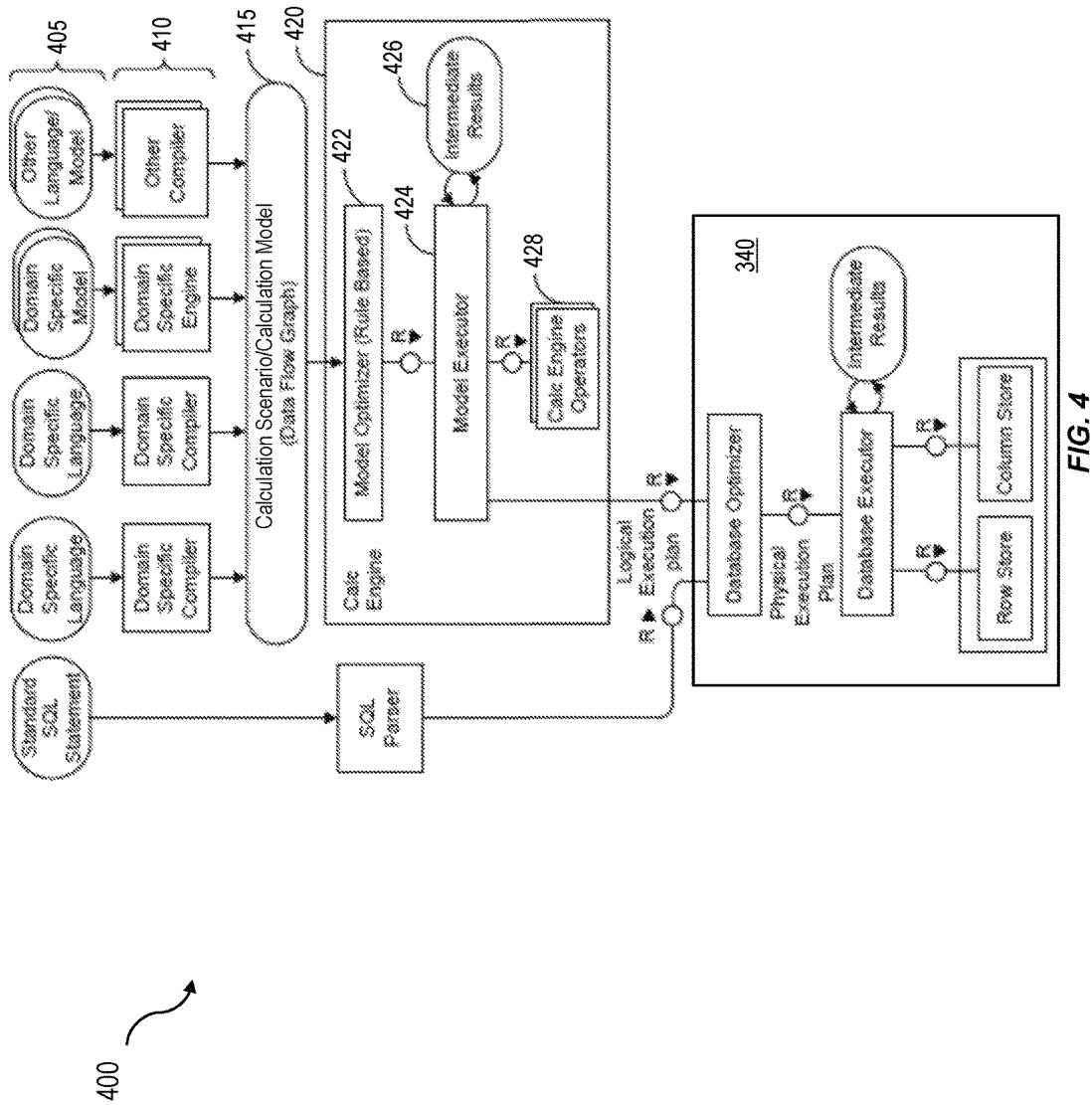
FIG. 4 depicts another example of a system including a calculation engine in which UNION pruning may be performed.

FIG. 4 is a diagram 400 illustrating a sample architecture for request processing and execution control. As shown in FIG. 4, artifacts 405 in different domain specific languages can be translated by their specific compilers 410 into a common representation called a "calculation scenario" 350 (which is also referred to in FIG. 4 as a calculation model). To achieve enhanced performance, the models and programs written in these languages are executed inside the database server 340. This arrangement eliminates the need to transfer large amounts of data between the database server 340 and a client application 337, which can be executed by an application server 335. Once the different artifacts 405 are compiled into this calculation scenario 415, they can be processed and executed in the same manner. A calculation engine 420 executes the calculation scenarios 415.

A calculation scenario 415 can be a directed acyclic graph with arrows representing data flows and nodes that represent operations. Each node, such as the UNION node, includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 337 at the application server 335). Inputs can be connected to tables or to the outputs of other nodes. A calculation scenario 415 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 415 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

In some example embodiments, the calculation engine 420 may store a pruning table, such as pruning table 110. The UNION node may include a field or other identifier mapping to the pruning table 110, so that the calculation engine can determine whether any of the data input nodes to the UNION node can be pruned.

A calculation scenario 415 can be defined as part of database metadata and invoked multiple times. A calculation scenario 415 can be created, for example, by a SQL statement "CREATE CALCULATION SCENARIO <NAME> USING <XML or JSON>". Once a calculation scenario 415 is created, it can be queried (e.g., "SELECT A, B, C FROM <scenario name>", etc.). In some cases, databases can have pre-defined calculation scenarios 415 (default, previously defined by users, etc.). Calculation scenarios 415 can be persisted in a repository (coupled to the database server 340) or in transient scenarios. Calculation scenarios 415 can also be kept in-memory.

Calculation scenarios 415 are more powerful than traditional SQL queries or SQL views for many reasons. One reason is the possibility to define parameterized calculation schemas that are specialized when the actual query is issued. Unlike a SQL view, a calculation scenario 415 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 415 may contain an aggregation node containing all attributes. Later, the attributes for grouping can be supplied with the query. This allows having a predefined generic aggregation, with the actual aggregation dimensions supplied at invocation time. The calculation engine 420 can use the actual parameters, attribute list, grouping attributes, and the like supplied with the invocation to instantiate a query specific calculation scenario 415. This instantiated calculation scenario 415 is optimized for the actual query and does not contain attributes, nodes or data flows that are not needed for the specific invocation.

When the calculation engine 420 gets a request to execute a calculation scenario 415, it can first optimize the calculation scenario 415 using a rule based model optimizer 422. Examples for optimizations performed by the model optimizer can include "pushing down" filters and projections so that intermediate results 426 are narrowed down earlier, or the combination of multiple aggregation and join operations into one node. Optimizations may also include pruning. The optimized model can then be executed by a calculation engine model executor 424 (a similar or the same model executor can be used by the database directly in some cases). This includes decisions about parallel execution of operations, UNION node pruning, and/or the like in the calculation scenario 415. The model executor 424 can invoke the required operators (using, for example, a calculation engine operators module 428) and manage intermediate results. Most of the operators are executed directly in the calculation engine 420 (e.g., creating the union of several intermediate results). The remaining nodes of the calculation scenario 415 (not implemented in the calculation engine 420) can be transformed by the model executor 424 into a set of logical database execution plans. Multiple set operation nodes can be combined into one logical database execution plan if possible.

The calculation scenarios 415 of the calculation engine 420 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 420 to execute the calculation scenario 415 behind the calculation view. In some implementations, the calculation engine 420 and the SQL processor are calling each other: on one hand the calculation engine 420 invokes the SQL processor for executing set operations and SQL nodes and, on the other hand, the SQL processor invokes the calculation engine 420 when executing SQL queries with calculation views.

The attributes of the incoming datasets utilized by the rules of model optimizer 422 can additionally or alternatively be based on an estimated and/or actual amount of memory consumed by the dataset, a number of rows and/or columns in the dataset, and the number of cell values for the dataset, and the like.

Figure 5:
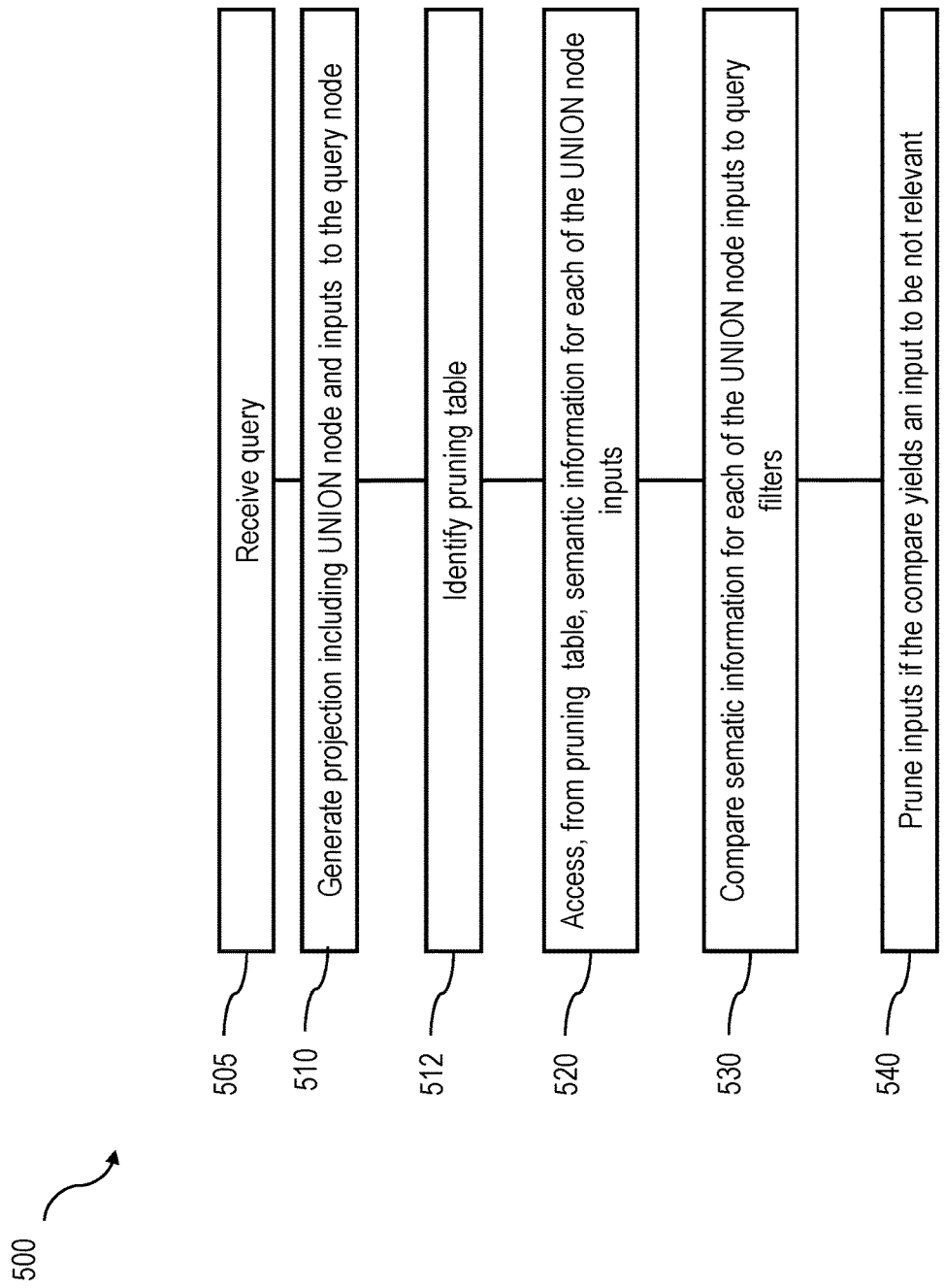
FIG. 5 depicts an example of a process for UNION pruning based on a pruning table.

A calculation scenario 415 as described herein can include a type of node referred to herein as a semantic node (or sometimes semantic root node). A database modeler can flag the root node (output) in a graphical calculation view to which the queries of the database applications directed as semantic node. This arrangement allows the calculation engine 420 to easily identify those queries and to thereby provide a proper handling of the query in all cases. FIG. 5 depicts an example process 500 for pruning, based on a pruning table, inputs to a UNION node.

At 505, a query may be received. For example, a processor such as a calculation engine or query optimizer may receive a query. At 510, the processor may process the received query to generate a calculation scenario. This may include generating a projection of nodes. If at least one of these nodes includes a UNION node having a plurality of inputs, the calculation scenario (and thus underlying query) may be optimized by pruning using a pruning table.

At 520, the UNION node may include a field or other indicator that identifies a certain pruning table. Referring to FIG. 1, the UNION node 152 may include an identifier that maps to pruning table 110. The processor may then access, at 520, the pruning table to read the semantic information needed to evaluate the query. Referring to the example of FIG. 1, processor may read semantic information 120A-H for each of the UNION node inputs in order to assess the filters "emp_year" and "income.

At 530, the semantic information from the pruning table may be compared to the filters. Referring to the example of FIG. 1, the processor may compare the semantic information 120A-H for each of the UNION node inputs to the filters "emp_year" and "income" to determine whether the inputs are likely to be relevant (for example, include information likely to be needed for the query using the filters).

If the comparison results in a determination that a given input is not likely to be relevant, then the processor may, at 540, prune the given input. Referring again to FIG. 2, the inputs E3 158 and E4 160 are pruned. This pruning may optimize the calculation scenario and thus the query. Next, the processor may initiate the execution of the optimized query by sending the optimize query to the database layer 340.

Without in any way limiting the scope, interpretation, or application of the claims appearing herein, a technical effect of one or more of the example embodiments disclosed herein may include increasing throughput of threads, maintaining power consumption (and as a result cooling demand) of a CPU below a certain threshold (which is according to the sizing of the power unit and cooling capacity of the computer system). Without in any way limiting the scope, interpretation, or application of the claims appearing herein, a technical effect of one or more of the example embodiments disclosed herein may include reducing the runtime of a series of tasks independently of the design of the task through the increased efficiency of accessing the priority queue of a task scheduler, by reducing lock contention on the priority queue, while decreasing the looseness that can be introduced by lock contention reducing algorithm These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed:

1. A method comprising:
   receiving, by a calculation engine, a query;
   processing a calculation scenario including a union node, wherein the union node receives at least a first input from a first data source node and a second input from a second data source node;
   accessing a pruning table associated with the union node, wherein the pruning table includes semantic information describing the first input from the first data source node and the second input from the second data source node, and wherein the union node includes an indication identifying the pruning table;
   determining whether the first data source node and the second data source node can be pruned by at least comparing the semantic information to at least one filter of the query; and
   pruning, based on a result of the determining, at least one the first data source node or the second data source node.

2. The method of claim 1, wherein the pruning table includes input identification information for at least one of the first input and the second input.

3. The method of claim 1, wherein the pruning table includes a calculation scenario identifier.

4. The method of claim 1, wherein the pruning table includes the semantic information including a description of the type of data being provided to the union node by at least one of the first data source node and the second data source.

5. The method of claim 4, wherein the pruning table includes, for the description, one or more values representing a range of values.

6. The method of claim 5, wherein the pruning table includes, for the description, a threshold value.

7. The method of claim 6, wherein the threshold value indicates whether the first data source node includes data that is greater than, less than, or equal to the threshold value.

8. The method of claim 7, wherein the comparing comprises comparing the at least one filter to the threshold value.

9. A system comprising:
   at least one physical processor and at least one memory including code which when executed causes operations comprising:
   receiving, by a calculation engine, a query;
   processing a calculation scenario including a union node, wherein the union node receives at least a first input from a first data source node and a second input from a second data source node;
   accessing a pruning table associated with the union node, wherein the pruning table includes semantic information describing the first input from the first data source node and the second input from the second data source node, and wherein the union node includes an indication identifying the pruning table;
   determining whether the first data source node and the second data source node can be pruned by at least comparing the semantic information to at least one filter of the query; and
   pruning, based on a result of the determining, at least one the first data source node or the second data source node.

10. The system of claim 9, wherein the pruning table includes input identification information for at least one of the first input and the second input.

11. The system of claim 9, wherein the pruning table includes a calculation scenario identifier.

12. The system of claim 9, wherein the pruning table includes the semantic information including a description of the type of data being provided to the union node by at least one of the first data source node and the second data source.

13. The system of claim 12, wherein the pruning table includes, for the description, one or more values representing a range of values.

14. The system of claim 13, wherein the pruning table includes, for the description, a threshold value.

15. The system of claim 14, wherein the threshold value indicates whether the first data source node includes data that is greater than, less than, or equal to the threshold value.

16. The system of claim 15, wherein the comparing comprises comparing the at least one filter to the threshold value.

17. A non-transitory computer-readable storage medium including program code which when executed causes operations comprising:
   receiving, by a calculation engine, a query;
   processing a calculation scenario including a union node, wherein the union node receives at least a first input from a first data source node and a second input from a second data source node;
   accessing a pruning table associated with the union node, wherein the pruning table includes semantic information describing the first input from the first data source node and the second input from the second data source node, and wherein the union node includes an indication identifying the pruning table;
   determining whether the first data source node and the second data source node can be pruned by at least comparing the semantic information to at least one filter of the query; and
   pruning, based on a result of the determining, at least one the first data source node or the second data source node.

* * * * *